(12) United States Patent
Akamatsu et al.

(10) Patent No.: US 9,735,637 B2
(45) Date of Patent: Aug. 15, 2017

(54) MAGNET-TYPE ROTATING ELECTRIC MACHINE

(71) Applicant: Mitsubishi Electric Corporation, Chiyoda-ku, Tokyo (JP)

(72) Inventors: Shingo Akamatsu, Tokyo (JP); Shinji Baba, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 726 days.

(21) Appl. No.: 14/044,386

(22) Filed: Oct. 2, 2013

(65) Prior Publication Data
US 2014/0333167 A1 Nov. 13, 2014

(30) Foreign Application Priority Data

May 9, 2013 (JP) .................................. 2013-099144

(51) Int. Cl.
*H02K 1/27* (2006.01)
*H02K 21/22* (2006.01)

(52) U.S. Cl.
CPC ......... *H02K 1/2786* (2013.01); *H02K 21/222* (2013.01)

(58) Field of Classification Search
CPC ........ H02K 21/222; H02K 1/02; H02K 21/12; H02K 21/14; H02K 7/00; H02K 29/08; H02K 16/02
USPC .................. 310/74, 156.08, 156.12–156.13, 310/156.26–156.31, 156.38
See application file for complete search history.

(56) References Cited

U.S. PATENT DOCUMENTS

| 3,334,254 A | * | 8/1967 | Kober | ................... H02K 1/276 310/156.07 |
| 4,115,716 A | * | 9/1978 | Ogasawala | .......... H02K 1/2786 310/153 |

(Continued)

FOREIGN PATENT DOCUMENTS

| JP | 60-190172 U | 12/1985 |
| JP | 11-308793 A | 11/1999 |

(Continued)

OTHER PUBLICATIONS

Communication dated Jul. 8, 2014, issued by the Japanese Patent Office in counterpart Japanese application No. 2013-099144.

*Primary Examiner* — Tran Nguyen
(74) *Attorney, Agent, or Firm* — Sughrue Mion, PLLC; Richard C. Turner

(57) ABSTRACT

There is provided an alternating current generator for a vehicle, including: a rotor (1), a flywheel (3), and main magnets (4) and auxiliary magnets (5) alternately arranged; and a stator (2). Each of the main magnets (4) is magnetized to an N-pole and an S-pole in a radial direction, whereas the main magnets (4) are arranged so that the main magnets (4) adjacent to each other through corresponding one of the auxiliary magnets (5) therebetween are magnetized to have opposite polarity patterns. Each of the auxiliary magnets (5) is magnetized to the N-pole and the S-pole in the circumferential direction, whereas the auxiliary magnets (5) are arranged so that the auxiliary magnets (5) adjacent to each other through corresponding one of the main magnets (4) therebetween are magnetized to have opposite polarity patterns.

9 Claims, 8 Drawing Sheets

(56) References Cited

U.S. PATENT DOCUMENTS

| | | | | |
|---|---|---|---|---|
| 4,242,610 A * | 12/1980 | McCarty | | H02K 1/278 310/156.59 |
| 4,701,654 A * | 10/1987 | Tatukawa | | H02K 1/2786 310/153 |
| 4,877,986 A * | 10/1989 | Shimizu | | H02K 1/2786 29/598 |
| 5,128,575 A * | 7/1992 | Heidelberg | | H02K 1/2786 310/156.41 |
| 6,614,140 B2 * | 9/2003 | Uemura | | H02K 5/128 310/153 |
| 6,841,910 B2 * | 1/2005 | Gery | | H02K 49/106 310/103 |
| 7,122,930 B2 * | 10/2006 | Yamagishi | | H02K 1/276 310/156.49 |
| 7,508,105 B2 * | 3/2009 | Baba | | H02K 1/2786 310/153 |
| 2005/0040721 A1 * | 2/2005 | Kusase | | H02K 1/32 310/156.43 |
| 2006/0138879 A1 * | 6/2006 | Kusase | | B60K 7/0007 310/67 R |
| 2009/0261667 A1 * | 10/2009 | Matsubara | | H02K 1/2766 310/54 |
| 2010/0181858 A1 * | 7/2010 | Hibbs | | H02K 12/27 310/156.07 |

FOREIGN PATENT DOCUMENTS

| | | | | |
|---|---|---|---|---|
| JP | 2000-197287 A | | 7/2000 | |
| JP | 2006-187116 A | | 7/2006 | |
| JP | 2006246570 A | * | 9/2006 | |
| JP | 2007-019127 A | | 1/2007 | |
| JP | 2007014110 A | * | 1/2007 | ............ H02K 1/276 |
| JP | 2007019127 A | * | 1/2007 | |
| JP | 2008-193785 A | | 8/2008 | |
| JP | 2009-038968 A | | 2/2009 | |
| JP | 2010-063201 A | | 3/2010 | |
| WO | 2013/008284 A1 | | 1/2013 | |

* cited by examiner

US 9,735,637 B2

1

MAGNET-TYPE ROTATING ELECTRIC MACHINE

BACKGROUND OF THE INVENTION

1. Field of the Invention

The present invention relates to a rotating electric machine including a rotor in which permanent magnets are arranged.

2. Description of the Related Art

The following AC generator for a vehicle is conventionally known as a magnet-type rotating electric machine. Specifically, permanent magnets are arranged on an inner wall surface of a bowl-like shaped flywheel so that the adjacent permanent magnets are magnetized to have opposite polarity patterns (for example, see Japanese Patent Application Laid-open No. 2008-193785; FIGS. 1 and 2).

In the above-mentioned AC generator for a vehicle, the flywheel rotates interlockingly with a rotary shaft which is rotationally driven by an internal combustion engine. By alternating magnetic fields generated by the permanent magnets, power is generated from magneto coils provided inside of the flywheel.

In the above-mentioned kind of magnet-type rotating electric machine, an output can be increased by increasing the amount of used permanent magnets or by using magnets excellent in magnetic characteristics. In such a case, however, there is a problem in that the magnet-type rotating electric machine is disadvantageously increased in size as well as in cost.

SUMMARY OF THE INVENTION

The present invention has been made to solve the problem described above, and has an object to provide a magnet-type rotating electric machine capable of improving an output without increasing size and cost.

According to one embodiment of the present invention, there is provided a magnet-type rotating electric machine, including:

a rotor including a rotary body having an inner circumferential wall surface, the rotary body rotating with a shaft, and main magnets and auxiliary magnets alternately arranged along a circumferential direction of the inner circumferential wall surface; and a stator provided on an inner diameter side of the rotor, for forming a magnetic circuit in cooperation with the rotor.

Each of the main magnets is magnetized to an N-pole and an S-pole in a radial direction, whereas the main magnets are arranged so that the main magnets adjacent to each other through corresponding one of the auxiliary magnets therebetween are magnetized to have opposite polarity patterns.

Each of the auxiliary magnets is magnetized to the N-pole and the S-pole in the circumferential direction, whereas the auxiliary magnets are arranged so that the auxiliary magnets adjacent to each other through corresponding one of the main magnets therebetween are magnetized to have opposite polarity patterns.

With the magnet-type rotating electric machine according to one embodiment of the present invention, the each of the main magnets is magnetized to the N-pole and the S-pole in the radial direction, while the main magnets are arranged so that the main magnets adjacent to each other through the corresponding one of the auxiliary magnets therebetween are magnetized to have the opposite polarity patterns. The each of the auxiliary magnets is magnetized to the N-pole and the S-pole in the circumferential direction, while the

2 auxiliary magnets are arranged so that the auxiliary magnets adjacent to each other through the corresponding one of the main magnets therebetween are magnetized to have the opposite polarity patterns.

Therefore, in comparison with a magnet-type rotating electric machine without auxiliary magnets, that is, only with the main magnets, the output can be improved without increasing size and cost.

DETAILED DESCRIPTION OF THE PREFERRED EMBODIMENTS

Figure 1:
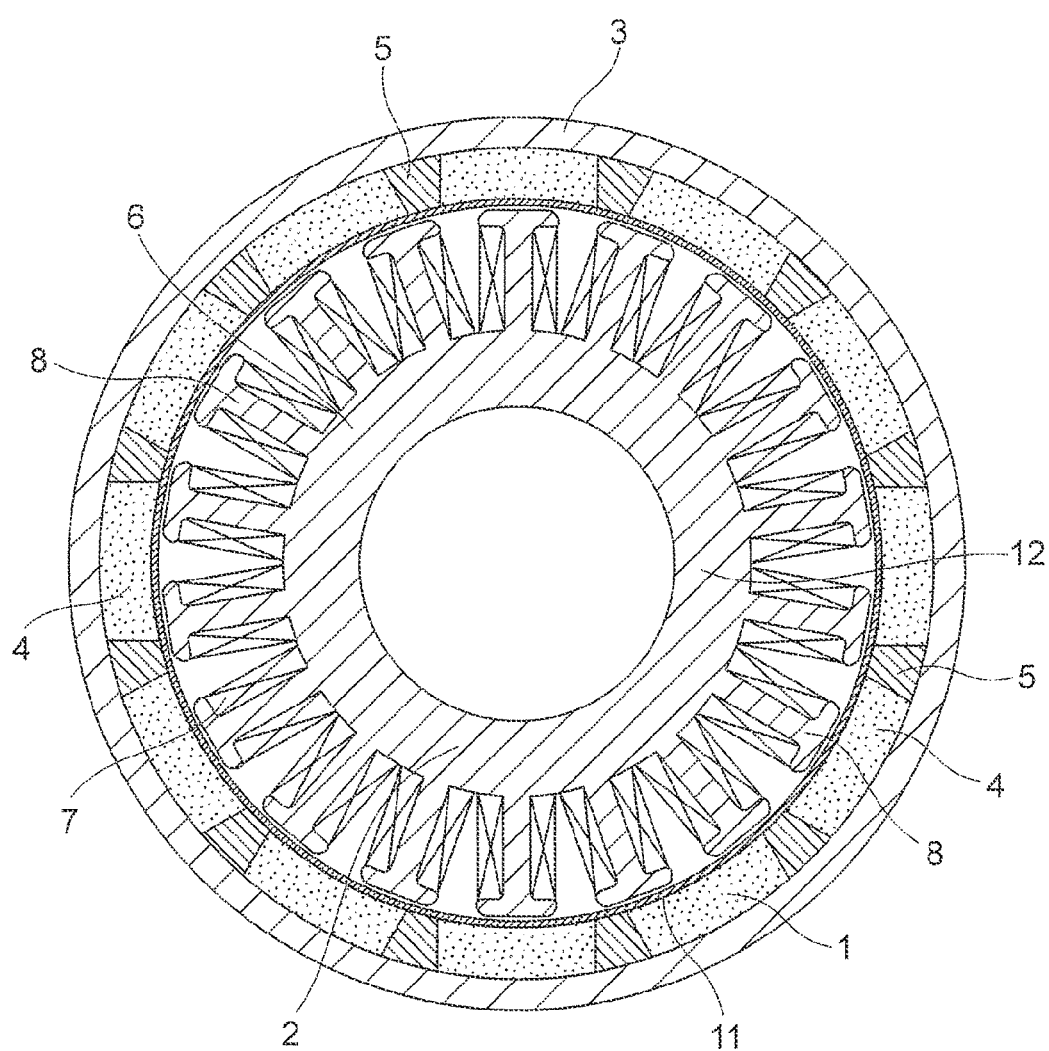
FIG. 1 is a front sectional view illustrating an AC generator for a vehicle which is a magnet-type generator according to a first embodiment of the present invention.

Embodiments of the present invention are hereinafter described referring to the accompanying drawings. In the drawings, the same or equivalent members and parts are denoted by the same reference symbols for description.

First Embodiment

Figure 2:
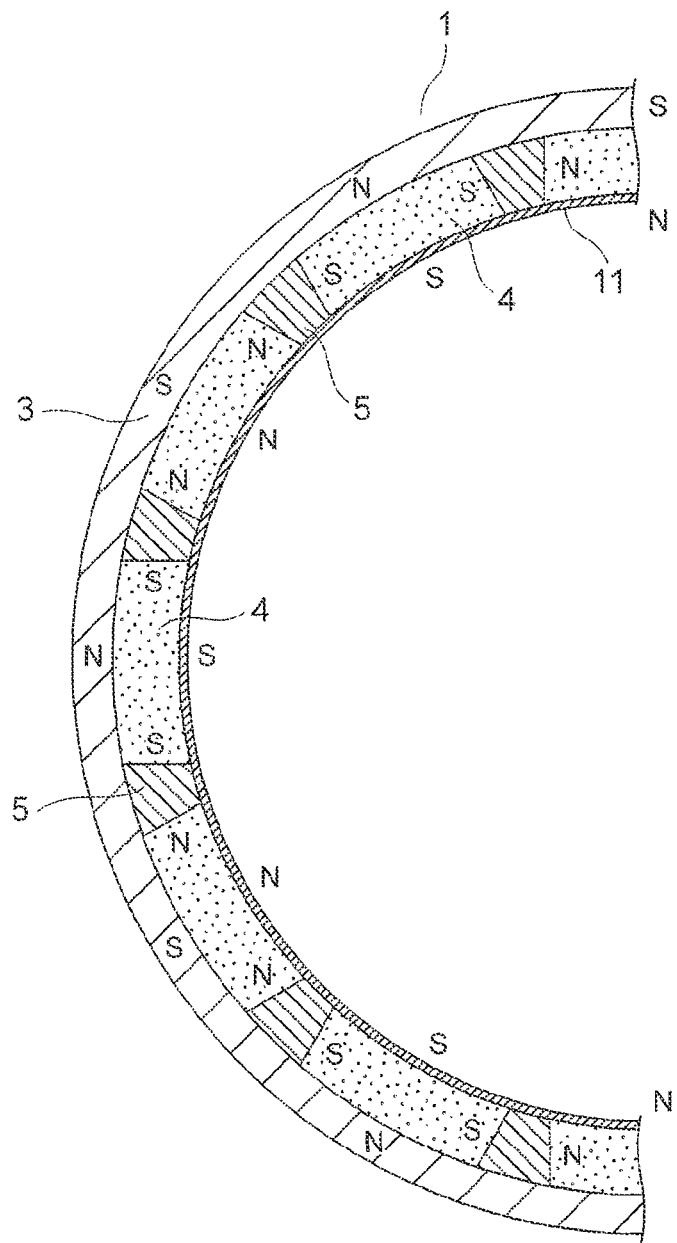
FIG. 2 is a partially enlarged view illustrating a rotor illustrated in FIG. 1.
Figure 3:
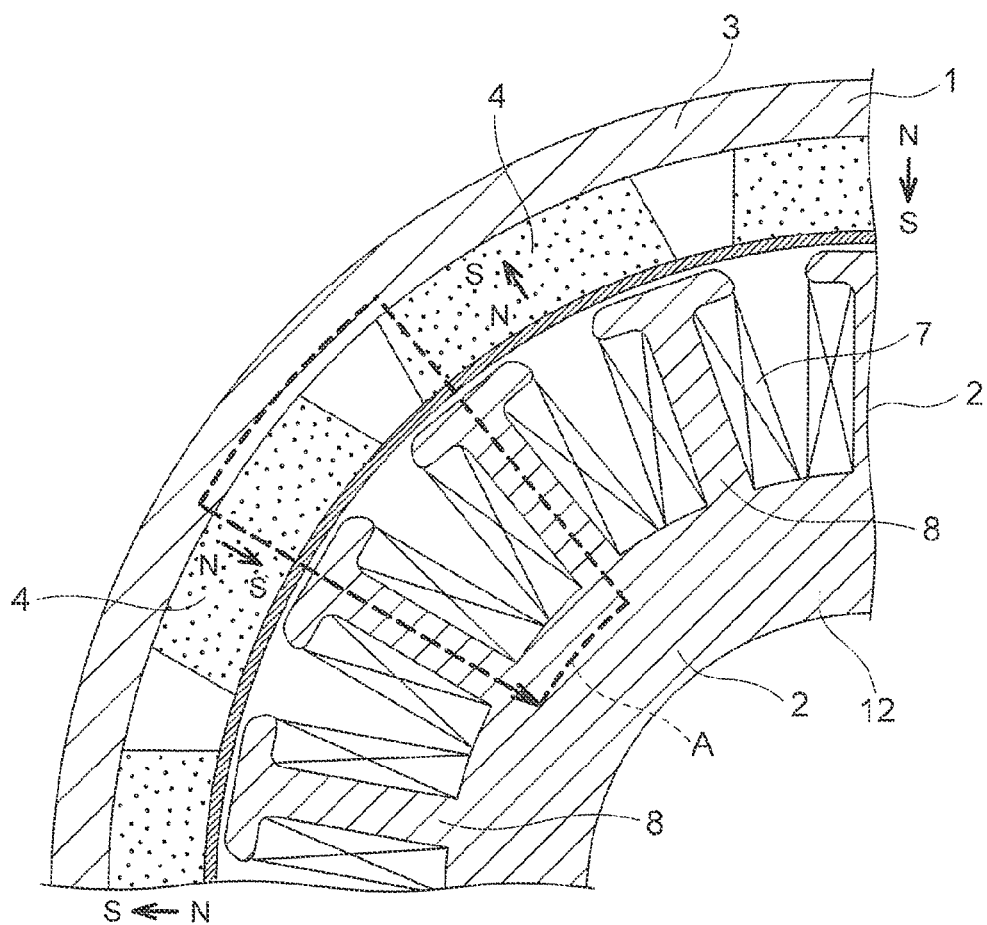
FIG. 3 is a partial sectional view illustrating an AC generator which is a reference example.
Figure 4:
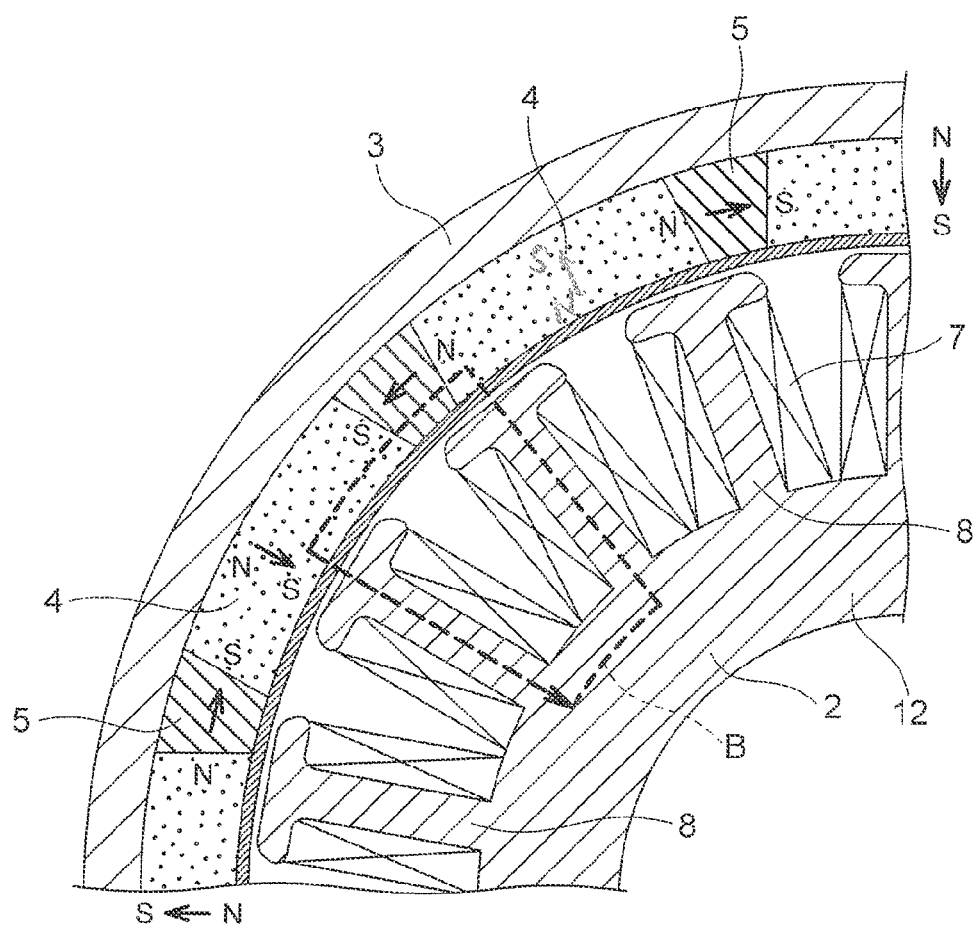
FIG. 4 is a partially enlarged view illustrating an AC generator illustrated in FIG. 1.
Figure 5:
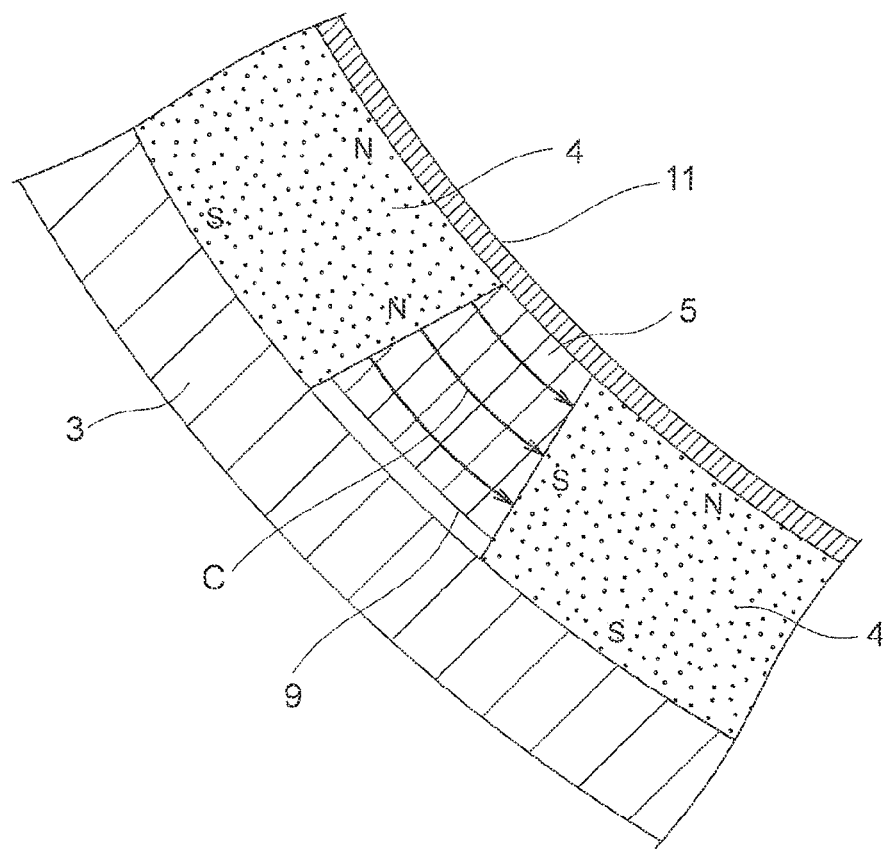
FIG. 5 is a partially enlarged view illustrating a rotor illustrated in FIG. 1.

FIG. 1 is a front sectional view illustrating an AC generator for a vehicle (hereinafter abbreviated as "AC generator") which is a magnet-type generator according to a first embodiment of the present invention, FIG. 2 is a partially enlarged view illustrating a rotor 1 illustrated in FIG. 1, FIG. 3 is a partial sectional view illustrating an AC generator which is a reference example, FIG. 4 is a partially enlarged view illustrating the AC generator illustrated in FIG. 1, and FIG. 5 is a partially enlarged view illustrating the rotor 1 illustrated in FIG. 1.

The AC generator, which is a magnet-type rotating electric machine, includes the rotor 1 and a stator 2. The rotor 1 is connected to an internal combustion engine through a shaft (not shown). The stator 2 is an armature provided inside of the rotor 1.

The rotor 1 includes a flywheel 3, a plurality of main magnets 4, a plurality of auxiliary magnets 5, and a pole tip 11. The flywheel 3 is a rotary body having a bowl-like shape, and is made of aluminum which is a non-magnetic material. The main magnets 4 and the auxiliary magnets 5 are alternately arranged along a circumferential direction of an inner circumferential wall surface of the flywheel 3. The pole tip 11 is provided on inner circumferential surfaces of the main magnets 4 and the auxiliary magnets 5. The pole tip 11 has a cylindrical shape supporting the main magnets 4 and the auxiliary magnets 5, and is made of non-magnetic stainless steel.

The stator 2 includes a stator core 6 and magneto coils 7. The stator core 6 has a hollow cylindrical shape, and is formed by laminating a plurality of magnetic thin steel plates.

The entire surface of the stator core 6 is covered with an insulating film. The stator core 6 includes a core main body 12 and a plurality of teeth 8. The core main body 12 has an annular shape. The teeth 8 are provided equiangularly, and project radially outward from the core main body 12 in a radial fashion.

Each of the magneto coils 7 includes a three-phase winding obtained by winding an enamel wire which is a conductor around each of the teeth 8.

Each of the main magnets 4 is magnetized to the N-pole and the S-pole in the radial direction, as illustrated in FIG. 2. Moreover, the main magnets 4 are arranged so that the main magnets 4 adjacent to each other through the auxiliary magnet 5 therebetween are magnetized to have the opposite polarity patterns.

Each of the auxiliary magnets 5 is magnetized to the N-pole and the S-pole in the circumferential direction, as illustrated in FIG. 2. Moreover, the auxiliary magnets 5 are arranged so that the auxiliary magnets 5 adjacent to each other through the main magnet 4 therebetween are magnetized to have the opposite polarity patterns.

The main magnets 4 are ferrite permanent magnets, whereas the auxiliary magnets 5 are rare-earth magnets.

An air gap 9 is formed between each of the auxiliary magnets 5 having a trapezoidal sectional shape and the flywheel 3, as illustrated in FIG. 5.

FIG. 3 illustrates a reference example where the auxiliary magnets 5 are not provided between the adjacent main magnets 4. In this example, as indicated by the arrow A in dotted line, a magnetic flux flows from the tooth 8 through the main magnet 4 and the flywheel 3 to the radially adjacent main magnet 4. Subsequently, the magnetic flux flows through the radially adjacent tooth 8 and the core main body 12 to return to the tooth 8. As a result, a magnetic circuit is formed between the rotor 1 and the stator 2.

On the other hand, in this embodiment, as illustrated in FIG. 4, the magnetic flux mainly flows from the tooth 8 through the main magnet 4, the auxiliary magnet 5, and the radially adjacent main magnet 4, as indicated by the arrow B in dotted line. The magnetic flux subsequently flows through the radially adjacent tooth 8 and the core main body 12 to return to the tooth 8. As a result, a magnetic circuit is formed between the rotor 1 and the stator 2.

Specifically, in the AC generator according to this embodiment, the auxiliary magnet 5 is present between the main magnets 4. Therefore, a direction of a vector of the magnetic flux flowing from the tooth 8 to the main magnet 4 is changed from the radial direction to the circumferential direction before the magnetic flux reaches the flywheel 3 due to a circumferential magnetic property of the auxiliary magnet 5.

In the AC generator according to this embodiment, the flywheel 3 rotates interlockingly with the shaft which is rotationally driven by the internal combustion engine. When the flywheel 3 rotates, power is generated in the magneto coils 7 by alternating magnetic fields generated by the main magnets 4 and the auxiliary magnets 5.

An AC output generated thereby is rectified by a rectifier (not shown) to be fed to an in-vehicle battery (not shown) and an electric load (not shown).

With the AC generator according to this embodiment, each of the main magnets 4 is magnetized to the N-pole and the S-pole in the radial direction. At the same time, the main magnets 4 are arranged so that the main magnets 4 adjacent to each other through the auxiliary magnet 5 therebetween are magnetized to have the opposite polarity patterns. Moreover, each of the auxiliary magnets 5 is magnetized to the N-pole and the S-pole in the circumferential direction. The auxiliary magnets 5 are arranged so that the auxiliary magnets 5 adjacent to each other through the main magnet 4 therebetween are magnetized to have the opposite polarity patterns.

Therefore, a magnetic-flux path of this embodiment does not pass through the flywheel 3, as indicated by the arrow B illustrated in FIG. 4, and hence is a principally shorter magnetic path than that illustrated in FIG. 3. With the shorter magnetic path, a magnetic resistance in the magnetic path becomes smaller, and a radial distance of the magnetic path between the rotor 1 and the stator 2 becomes shorter.

Thus, the magnetic flux generated by the auxiliary magnets 5 and the main magnets 4 at a high density is linked to the magneto coils 7. Accordingly, a power output is improved without increasing a physical size of the entire AC generator.

Moreover, the flywheel 3 is conventionally required to have a predetermined thickness in the radial direction in accordance with an output current in order to ensure the magnetic path.

On the other hand, a thickness of the AC generator according to this embodiment can be reduced as long as a mechanical strength is not impaired. Therefore, aluminum, which is a non-magnetic material light in weight and excellent in heat-radiation performance, can be used.

Further, the main magnets 4 are provided so as to be held in close contact with the inner circumferential wall surface of the flywheel 3 which is the rotary body, whereas the auxiliary magnets 5 face the inner circumferential wall surface of the flywheel 3 through the air gaps 9 therebetween.

Therefore, each of the air gaps 9 contributes as a magnetic resistor to reduce the amount of leakage to the flywheel 3 of the magnetic flux flowing from the main magnets 4 to the auxiliary magnets 5. Thus, the flywheel 3 can be further reduced in thickness as well as in weight. In addition, the output of the AC generator is improved.

In each of the air gaps 9 of this embodiment, a thermally-conductive member made of a silicone material, an acrylic resin, graphite, or the like, which has characteristics such as thermal conductivity, an electric insulating property, flexibility, adhesiveness, heat resistance, and flame resistance, may be provided.

By providing the thermally-conductive material in each of the air gaps 9, heat generated from each of the main magnets 4 and the auxiliary magnets 5 is transferred to the flywheel 3 to restrain an increase in temperature of the main magnets 4 and the auxiliary magnets 5. As a result, demagnetization due to lowered BH characteristics caused by the increase in temperature can be prevented.

Further, each of the auxiliary magnets 5 has a trapezoidal shape which enlarges radially outward in the circumferential direction when the auxiliary magnet 5 is cut in a direction vertical to an axis line of the shaft.

With such a shape, the magnetic flux in each of the auxiliary magnets 5 flows in an arc-like pattern, as indicated by the arrows C illustrated in FIG. 5. As a result, the direction of the vector of the magnetic flux, which is radially oriented in each of the main magnets 4, smoothly changes toward the adjacent auxiliary magnet 5, that is, in the circumferential direction.

Therefore, the magnetic flux in each of the main magnets 4, which is oriented radially outward, is smoothly guided to the auxiliary magnet 5 adjacent thereto in the circumferential direction. Then, the magnetic flux directly flows through the auxiliary magnet 5 and the main magnet 4 to the tooth 8. As a result, the power output is improved without increasing the physical size of the AC generator.

Further, the main magnets 4 and the auxiliary magnets 5 are held in close contact with each other, and the magnetic poles are formed along the entire circumference. Therefore, not only a leakage flux from the main magnet 4 present within the range of an electric angle of 180° but also a leakage flux flowing radially inward from the auxiliary magnet 5 can flow into each of the teeth 8 of the stator core 6 of the stator 2. Therefore, the amount of effective flux can be increased.

Further, a curvature radius of each of the main magnets 4 and that of each of the auxiliary magnets 5 are equal to each other. Specifically, a size of a clearance between the inner circumferential surface of the rotor 1 and the outer circumferential surface of the stator 2 is the same over the entire circumference.

Therefore, the size of the clearance between the rotor 1 and the stator 2 can be uniformly reduced over the entire circumference. As a result, a magnetic resistance between the rotor 1 and the stator 2 can be reduced, while a length of the magnetic circuit can be minimized. Accordingly, the power output is improved without increasing the physical size of the AC generator.

In this embodiment, the rear-earth magnet having a higher magnetic flux density than that of the ferrite permanent magnet is used as each of the auxiliary magnets 5. The rear-earth magnet is high in cost as compared with the ferrite permanent magnet. However, the rear-earth magnet has a high magnetic flux density. Therefore, the rear-earth magnet having reduced radial size and circumferential size can be used as the auxiliary magnet 5. Consequently, cost can be prevented from increasing.

Second Embodiment

Figure 6:
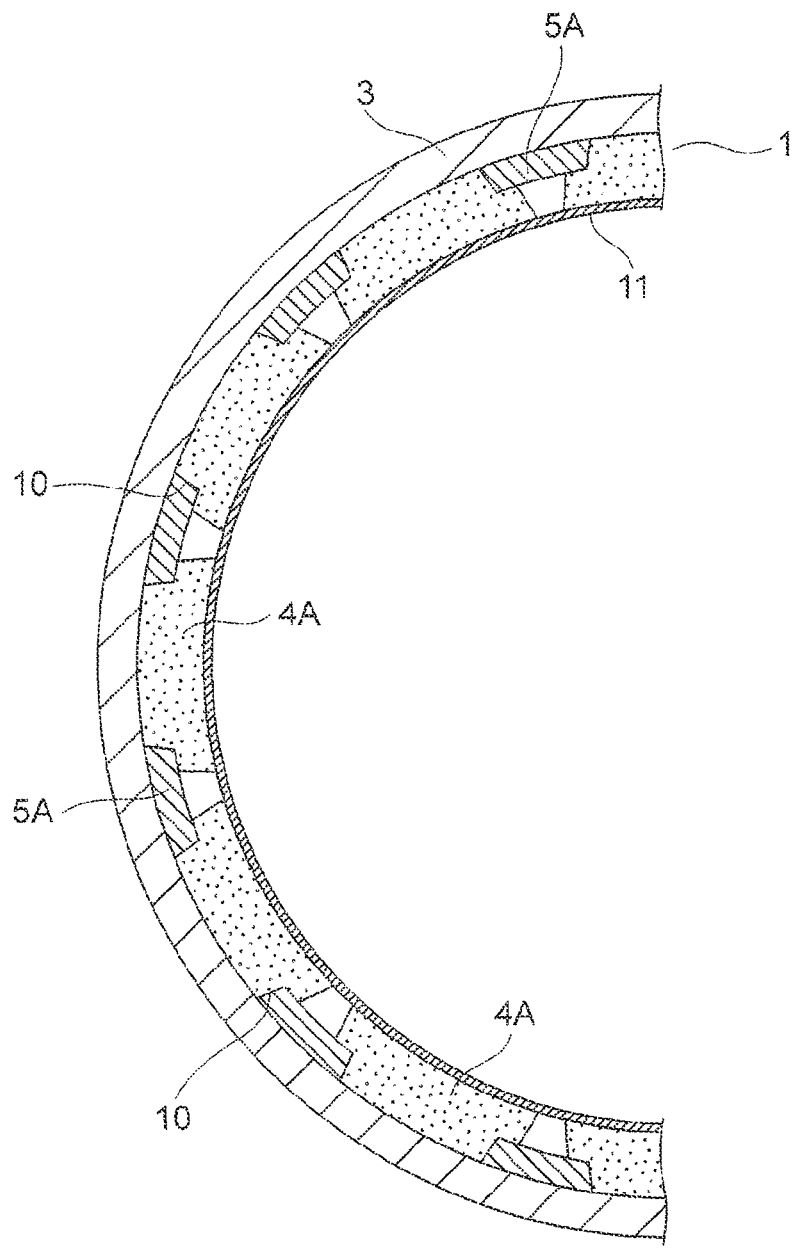
FIG. 6 is a front sectional view illustrating a principal part of a rotor of an AC generator according to a second embodiment of the present invention.

FIG. 6 is a front sectional view illustrating a principal part of a rotor 1 of an AC generator according to a second embodiment of the present invention.

In this embodiment, a concave portion 10 is formed between adjacent main magnets 4A on the outer circumferential side. In the concave portion 10, each of auxiliary magnets 5A is fitted.

The remaining configuration is the same as that of the AC generator of the first embodiment.

The auxiliary magnet 5A and the main magnet 4A repel against each other with a strong force. In this embodiment, however, the auxiliary magnet 5A is fitted into the concave portion 10. Therefore, the rotor 1 is prevented from losing rotation balance due to, for example, misalignment of the auxiliary magnet 5 during the rotation of the rotor 1.

Alternatively, a concave portion may be formed between the adjacent main magnets 4A on the inner circumferential side so that the auxiliary magnet is fitted into the concave portion.

Third Embodiment

Figure 7:
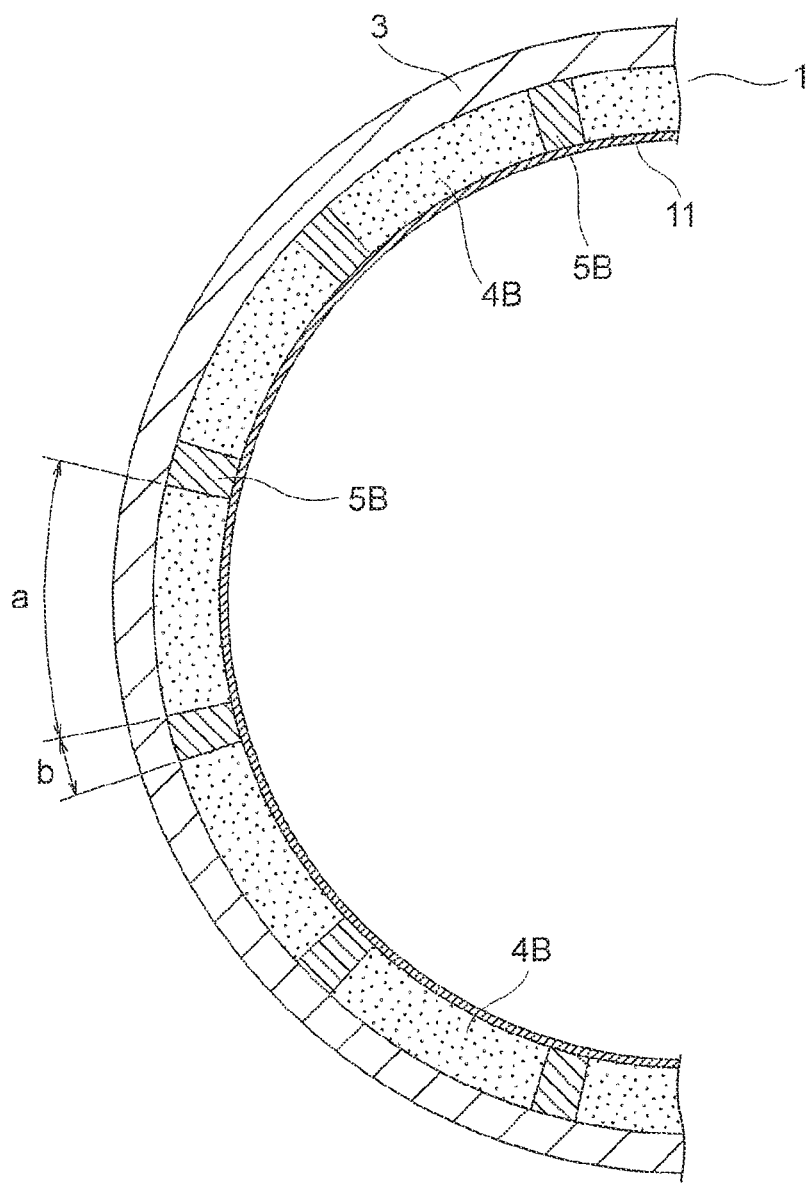
FIG. 7 is a front sectional view illustrating a principal part of a rotor of an AC generator according to a third embodiment of the present invention.

FIG. 7 is a front sectional view of a principal part of a rotor 1 of an AC generator according a third embodiment of the present invention.

In this embodiment, a width b of an auxiliary magnet 5B in the circumferential direction is set with respect to a width a of a main magnet 4B in the circumferential direction so that a ratio b/a falls within the range of 1/10 to 1/2.

The remaining configuration is the same as that of the AC generator according to the first embodiment.

By providing the auxiliary magnet 5B, a volume of the main magnet 4B is inevitably reduced. Therefore, if the width b of each of the auxiliary magnets 5B in the circumferential direction is set extremely large, a volume of the main magnets 4B is reduced, which leads to a reduction in the amount of magnetic fluxes of the main magnets 4B, which are linked to the magneto coils 7.

In view of the above-mentioned problem, paying attention to the relationship between the ratio of the width of the main magnet 4B in the circumferential direction and that of the auxiliary magnet 5B in the circumferential direction and the power output of the AC generator, the inventor of the present invention has analyzed the magnetic field for the above-mentioned relationship.

Figure 8:
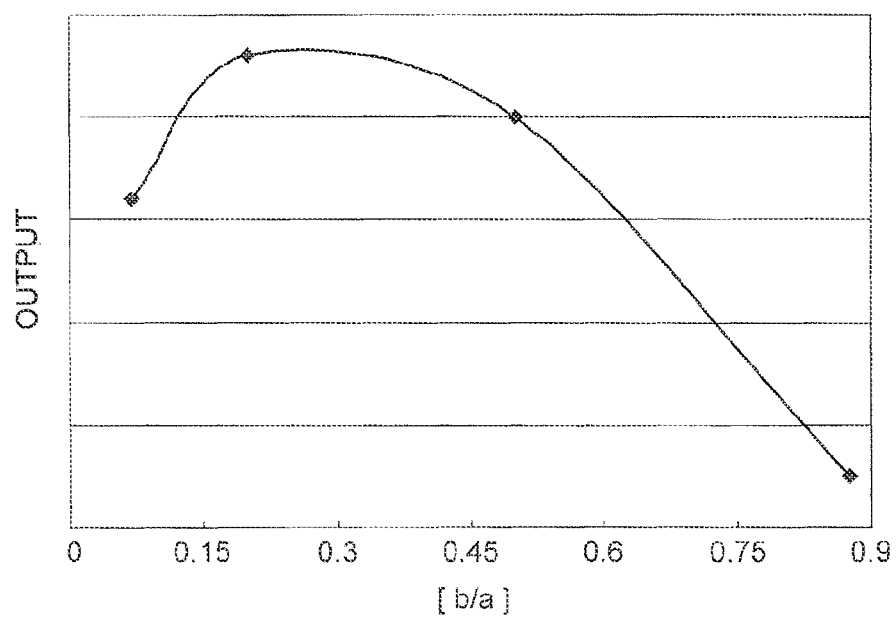
FIG. 8 is a view illustrating the relationship between the ratio (b/a) of the width of the main magnet in the circumferential direction and that of the auxiliary magnet in the circumferential direction and the power output of an AC generator illustrated in FIG. 7.

FIG. 8 shows the result of the magnetic-field analysis.

The result shows that the output can be efficiently improved by setting the ratio b/a of the width b of the auxiliary magnet 5B in the circumferential direction to the width a of the main magnet 4B in the circumferential direction so as to fall within the range of 1/10 to 1/2.

Although the AC generator for a vehicle has been described as the magnet-type rotating electric machine in each of the embodiments described above, the present invention is not limited to the AC generator for a vehicle. Moreover, the present invention is also applicable to an electric motor.

Moreover, although non-magnetic aluminum has been used as the material of the flywheel 3 used as the rotary body, non-magnetic stainless steel may be used instead. Further, a magnetic steel material may be used.

What is claimed is:
1. A magnet-type rotating electric machine, comprising:
a rotor comprising a rotary body having an inner circumferential wall surface, the rotary body rotating with a shaft, and main magnets and auxiliary magnets alternately arranged along a circumferential direction of the inner circumferential wall surface; and
a stator provided on an inner diameter side of the rotor, for forming a magnetic circuit in cooperation with the rotor,
concave portions formed between the adjacent main magnets on one of an outer circumferential side and an inner circumferential side thereof, wherein:
each of the main magnets is magnetized to an N-pole and an S-pole in a radial direction, whereas the main magnets are arranged so that the main magnets adjacent to each other through corresponding one of the auxiliary magnets therebetween are magnetized to have opposite polarity patterns;
each of the auxiliary magnets is magnetized to the N-pole and the S-pole in the circumferential direction, whereas the auxiliary magnets are arranged so that the auxiliary magnets adjacent to each other through corresponding one of the main magnets therebetween are magnetized to have opposite polarity patterns, the main magnets are held in close contact with the inner circumferential wall surface of the rotary body, whereas each of the auxiliary magnets is spaced apart from the inner circumferential wall surface of the rotary body to provide an air gap therebetween, and the auxiliary magnets are respectively provided in the concave portions.

2. A magnet-type rotating electric machine according to claim 1, wherein the main magnets and the auxiliary magnets are held in close contact with each other in the circumferential direction.

3. A magnet-type rotating electric machine according to claim 1, wherein a curvature radius of each of the main magnets and a curvature radius of each of the auxiliary magnets are equal to each other.

4. A magnet-type rotating electric machine according to claim 1, wherein each of the auxiliary magnets has a trapezoidal shape enlarging radially outward in the circumferential direction when the each of the auxiliary magnets is cut in a direction vertical to an axis line of the shaft.

5. A magnet-type rotating electric machine according to claim 1, wherein a width of each of the auxiliary magnets in the circumferential direction is set with respect to a width of each of the main magnets in the circumferential direction so that a ratio thereof falls within a range of 1/10 to 1/2.

6. A magnet-type rotating electric machine according to claim 1, wherein the main magnets comprise ferrite permanent magnets, whereas the auxiliary magnets comprise rare-earth magnets.

7. A magnet-type rotating electric machine according to claim 1, wherein the rotary body is made of aluminum.

8. A magnet-type rotating electric machine according to claim 1, wherein the stator comprises a stator core including a plurality of teeth provided equiangularly to project radially outward in a radial fashion and magneto coils formed by winding a conductor around the plurality of teeth.

9. A magnet-type rotating electric machine according to claim 8, wherein the rotary body comprises a flywheel, whereas the magnet-type rotating electric machine comprises an alternating current generator for a vehicle.

* * * * *